United States Patent [19]

Travaglini

[11] Patent Number: 5,681,595
[45] Date of Patent: Oct. 28, 1997

[54] MOTION TRANSFER MECHANISM

[76] Inventor: Nick Travaglini, 51 Harris Crescent, Woodbridge, Ontario, Canada, L4L 1S1

[21] Appl. No.: 577,648

[22] Filed: Dec. 22, 1995

[51] Int. Cl.$^6$ ............................................. B29C 45/42
[52] U.S. Cl. ...................... 425/436 R; 74/99 R; 425/444; 425/556
[58] Field of Search .................... 425/556, 436 R, 425/436 RM, 441, 443, 444, DIG. 5; 74/99 R

[56] References Cited

U.S. PATENT DOCUMENTS

| | | | |
|---|---|---|---|
| 4,449,914 | 5/1984 | Schmidts et al. | 425/556 |
| 4,589,840 | 5/1986 | Schad | 425/556 |
| 4,787,841 | 11/1988 | Simon | 425/556 |
| 4,976,603 | 12/1990 | Disimone | 425/556 |
| 5,037,597 | 8/1991 | McGinley et al. | 425/556 |
| 5,334,009 | 8/1994 | Urbanek et al. | 425/556 |
| 5,513,970 | 5/1996 | Kimura et al. | 425/556 |
| 5,518,387 | 5/1996 | DiSimone | 425/556 |
| 5,531,588 | 7/1996 | Brun, Jr. et al. | 425/556 |

*Primary Examiner*—James P. Mackey
*Attorney, Agent, or Firm*—Weingarten, Schurgin, Gagnebin & Hayes LLP

[57] ABSTRACT

A motion transfer mechanism has an elongated track upon which ride transfer mechanisms, to translate relative movements of the track into precise actuation of one or a plurality of transfer mechanisms. The track is of substantially unlimited length, in relation to the machine with which it is used, such as the press of a stacked injection mold, so as not to limit access to, or the range of motion of the press or other machine. The transfer mechanisms each rides upon the track, such that they can freely traverse its full length. The track has one or more spiral portions in its length, to translate relative longitudinal displacement into rotational movement. The angle of spiral can be varied, with local changes in angle, on order to achieve desired rates of acceleration, deceleration and periods of dwell in the operation of the output mechanism. The transfer mechanisms and the track mounting each have a simple enabling and disabling mechanism, which may be interconnected by a simple, manually operable, bang-bang hydraulic control, to enable an operator to effect operation or disablement of the system with a single hand motion. The system may be used with high cycle processes such as an injection mold, the track and motion transfer portions of the system being comprised exclusively of simple, robust, low stress mechanical components of extreme reliability, without power cylinders or other prime movers or limit switches, relays or other electronic components that collectively diminish system reliability. In the case of use of the system to introduce product take-off devices, such as suction cups between the open platen faces of a mold, the system may be secured in "strap-on" relation to the sides of the respective components of the mold, to generate precise in-and-out actuation of the product handling devices between the mold interfaces during the ejection portion of the molding cycle in response to the normal cyclic movements of the mold.

15 Claims, 4 Drawing Sheets

MOTION TRANSFER MECHANISM

FIELD OF THE INVENTION

This invention is directed to a motion transfer mechanism, and in particular to a track-driven motion transfer device capable of driving a plurality of mechanisms in synchronized or phased relation.

BACKGROUND TO THE INVENTION

In complex machines the provision of synchronized or phased interaction between various parts of a machine is difficult to achieve. The difficulties of providing a desired set of mechanical motions, such as the precise insertion and location of machine parts in synchronized or phased sequential relation may be further complicated by space limitations that exist within the machine and its environment.

Many existing machines, as for instance in the plastic molding industry, rely upon independently powered actuators such as air cylinders to provide precise, integrated functions. These in turn frequently rely upon electric controls including limit switches etc. In addition to the complexity involved, such components also introduce an uncertainty factor to the system, comprising the sum of the unreliability factors of all of the individual components.

In the case of a multi-level stacked mold, for instance, the opening of the mold may require a press opening exceeding one meter (39 inches), yet each level of the mold has a pair of opening die faces at which a molded plastic article or series of articles will be ejected. At this stage of operations, the danger exists of the trapping of product between the closing mold faces. In order to facilitate the operation downstream of automated packing equipment it is highly desirable that the products be controlled in their orientation as they descend from the mold.

Owing to the requirement to keep mold cycle times as short as possible, little time is available for moving ancillary equipment such as product take-off into the critically timed gap openings, followed by the even more critical requirement to vacate the mold interface spaces before destructive contact can occur between the introduced ancillary equipment and the closing faces of the dies.

One well known mechanical device frequently used for powering such arrangements may comprise a cam-track and follower device, wherein the operation of an actuator to position and locate a component or components is effected by a linear cam-track having a cam follower resiliently urged thereagainst. The follower is connected in controlling relation with the mechanism to be actuated. These types of synchronized controllers have certain disadvantageous characteristics, such as a limitation upon the acceptable cam angle for the cam-track. Too steep a track angle can generate unacceptably high stresses in the mechanism with undue wear as a consequence.

In the case of systems employing worm gears, these are difficult to disengage, other than by the added complexity of a clutch mechanism, with its associated space requirements. They also are unsuited for the output provision of acceleration/deceleration or dwell modes.

In German Gebrauchsmuster No. G 91 07 300.6 published Nov. 29, 1991 there is disclosed a motion transfer mechanism mounted upon the press of a single cavity mold. A pair of axially extending elongated cylindrical housing are mounted in adjacent superposed relation on one side of the press. Each has a motion translation head rotatably mounted on the outer end of the housing for rotation in a fixed plane, normal to the axis of the machine and of the cylinder. Each head carries a crank with a connecting rod extending therefrom. The remote ends of the connecting rods carry an intermediate link therebetween on which link is mounted a product handling device. Owing to the driving of the two heads in mutually opposing relation, one clockwise and the other counter-clockwise, and vice versa, the intermediate link is always maintained in vertical orientation, thereby maintaining the attached device correspondingly oriented. The motion translation heads are each driven by a cam shaft, each of which shafts has its remote end secured to the face of the press.

The free end of each cam shaft extends through a respective motion head and is entered into a respective one of the cylindrical housings, wherein they each oscillate axially, with the motion of the press. Each cam shaft has a recessed cam groove relieved into its surface, into which groove a respective cam follower extends. Each cam follower is connected to its respective head, in rotational positioning relation therewith.

This prior art arrangement has a number of important limitations, namely:

a) the provision of dual cam shafts in spaced apart relation significantly obstructs access to the mold faces;

b) the use of recessed cam grooves requires the use of groove followers. Such followers have to be introduced within the respective grooves, and during operation almost invariably each makes rubbing contact with one side or other of its groove, if close groove following with little or no back-lash or play in the mechanism is to be achieved, and vertical positioning of the intermediate link is to be maintained.

c) The permissible width and depth of the groove require relatively small size follower components, with correspondingly limited strength, and associated high stress and wear rates.

d) In order to achieve acceptable strength and stress levels, this type of mechanism becomes unduly bulky and heavy to handle.

e) The permissible relative stroke of the useful output cam shafts is limited both by the length of the cam groove, and by the length of travel of the two parallel cam shafts. This, in turn is limited by the depth of the cylindrical housings into which the cam shafts must penetrate.

f) The arrangement is suited for use only with a single level mold.

g) The arrangement contains no apparent provision for disengagement from operation other than partial or complete disassembly of the mechanism.

SUMMARY OF THE INVENTION

The present invention provides a motion transfer mechanism including an elongated track having a polar axis; the track having at least one spiral or part-spiral actuation surface extending along at least a portion of its length; track riding means mounted in contacting relation with the at least one actuation surface, for longitudinal displacement relative thereto; the track having at least one portion of the aforesaid at least one actuation surface inclined in predetermined spiral angled relation about its polar axis through a predetermined angle of displacement relative to an adjoining straight portion of the track; track support means for selectively positioning the track in predetermined relation with an adjacent mechanism to which it is connected in controlling relation therewith; and actuating means to produce relative longitudinal displacement between the track and the track riding means, to generate rotational displacement of the track riding means, to thereby control the adjacent mechanism.

In the aforesaid motion transfer mechanism, the track may be displaced longitudinally relative to the track riding means, to pass the at least one spiral portion of the track in contacting, repositioning relation with the track riding means, to produce relative rotation of the track riding means about the track.

In a preferred embodiment, a track comprising an elongated round shaft has a pair of mutually parallel flats machined on opposite sides and extending the full length of the shaft. Selected longitudinal portions of the flats, which constitute actuating guide surfaces are inclined in spiral or part-spiral relation about the shaft polar axis. It will be understood that a wide range of alternative track profiles may be adopted. One or more track rider mechanisms each have a pair of follower rollers rotatable mounted in needle bearings, to follow the opposed track surfaces in smooth rolling relation. Upon encountering a spirally inclined portion of the track, the rollers change their polar orientation so as to precisely follow the track, thereby imparting relative rotational motion to the output-connected portion of the track rider. This motion is transferred to an output crank having a connecting rod pinned thereto, and connected with a mechanism that is to be repositioned.

The preferred output-connected portion of each rider mechanism is provided with a 360-degree adjustment capability, with but a single backoff and re-tightening operation of the related capscrew required.

The adoption of this type of track with an unrecessed open cam surface enables the use of a track of substantially unlimited length. The capability to readily machine selected angular transitions in the spiral angle of a track enables almost unlimited rates of acceleration, deceleration, and precise dwell periods. The extreme robustness of the component parts, the shaft, particularly the follower rollers, ensures low stress and makes possible a very high degree of reliability.

The subject embodiments may be used in a 2-level stacked mold, or adapted to a single level mold, with virtually no modification.

The preferred embodiment includes a control system which enables and disables the motion transfer mechanism.

In the disabled condition of the preferred embodiment, the track is freed from rotational constraint, while the track rider or riders are locked in their withdrawn location, clear of the mold openings.

In this disabled condition, the relative axial motion of the mold stack components produces longitudinal displacement of the track relative to its operable riders. Upon longitudinal motion of the track, the incidence of a spiral portion thereof against the rollers of a rider will simply produce corresponding, controlled rotation of the track about its polar axis. In these circumstances, there is no limit upon the axial displacement that can be applied to the track, thereby enabling the opening of the press, far past its cyclic molding travel, to the full extent of the stroke of the press. This affords virtually unimpeded access to the mold faces for set-up and servicing purposes.

In the preferred embodiment the enabling/disabling control system comprises a dog clutch arrangement for each track component, comprising the track mounting housing and each track rider housing. Each "clutch" comprises a simple insertable and withdrawable actuator pin, that forms a part of the respective track component. With the control system in an enabled state, the actuating pin of the track mounting housing is in its inserted position, to lock the track against rotation, while the actuating pin for each track rider is in a withdrawn, non-engaging position, to permit the operation of the track rider and its respective connected device.

Reversal of the respective pin positions disables the system, whereby the track is freed for rotation about its polar axis, while the track riders and their respective connected mechanisms are pinned to their respective housing, and thus immobilized.

Operation of the actuator pins may be carried out fully manually, or carried out using a manually operated hydraulic control portion of the system. In the latter case, each actuator pin has a double-acting hydraulic actuating cylinder connected to a double-acting control cylinder, which may be hand-operated.

In operation of the system, with one actuator pin being engaged and the others disengaged, the pin actuating cylinders are connected in mutually reversed relation with the control cylinder. Movement of the controlling hand-lever to one extreme drives the respective actuator pins in mutually opposed directions, to engage the system. Reverse movement of the hand lever to the other extreme drives the actuator pins to disengage the system. In some instances, a single such actuator pin may serve the requirements of the system.

The respective track mounting housing and the track rider housings may be secured in so-called "strap-on" relation, being bolted to their respective mold housing in axially aligned relation in a common plane, at virtually any selected angular location about the mold.

In a different, so-called reversely operating embodiment of the invention, the track mounting means may permit rotation of the track about its polar axis, when operating with the mold cycle; while the track riding means includes a first, non-rotatable track guiding portion, to produce the desired spiral repositioning of the track upon axial displacement of a spiral portion of the track past the track-guiding riding means. The other track rider members are then mounted in sliding, operational relation upon straight or spiral portions of the track, whereby rotation of the track produces a corresponding rotational component for each rider or riders, and actuation of their associated output connections in accordance with the algebraic sum of their rotational inputs.

The use, as an alternative to the crank and connecting rod of gear means connected in actuating relation with the adjacent mechanism, is further contemplated.

It will be understood that the spiral angle of the track actuation surface may be selected as a constant or as a changing angle, in order to provide desired instantaneous rates of acceleration and extents of deployment of the controlled associated mechanism, while the handing of the spiral will determine the relative direction of displacement of the system output.

While disclosed herein primarily as a system relating to actuators for molding machine auxiliaries, it will be understood that the scope of use is not thus limited.

Certain unobvious and highly beneficial characteristics of the subject motion transfer mechanism are:

1. It can be readily applied as an external "strap-on" motion supplying system, with a wide range of locations.

2. The system lends itself readily to driving of the motion transfer device and its associated system, such as product take-off within a mold, by a moving portion of the primary mechanism. The motion of the components of the mold, in their opening and closing may be used to drive the track.
3. High positioning accuracy, and precise operational timing and sequencing are readily achieved, with simple, angular adjustability to the outputs.
4. Outstanding accessibility and comparatively simple and independent adjustability are incorporated.
5. An unusual degree of synchronous or phased operation of a potentially large number of system components is made possible.
6. System components are purely mechanical, simple and extremely robust, and very readily accessible both for installation, adjustment, servicing, and also for operational observation.
7. The system can be disengaged during operation of the primary mechanism, namely the mold of the selected example, during start-up and de-bugging of the system, and readily re-engaged in synchronized relation for operation automatically, by the action of the primary mechanism.
8. The system readily permits the provision of a range of accelerations/decelerations and dwells to the system output.
9. An unusually high degree of reliability is possible owing to the exclusive use of extremely robust mechanical parts, under low-stress conditions, and of predominantly pivotal connections in the transfer portion of the mechanism.
10. The adoption of a track and riders of the types herein disclosed, as distinct from a camshaft of the prior art, enables the employment of a track of great stiffness of virtually unlimited length, with the consequent capability for the press to be opened to its fullest extent, as compared with its cyclic openings of limited extent, when in operation.
11. Despite the extreme robustness of its component parts, the system is compact, leaving both access to the mold and press, and room for other items of mold equipment.
12. The tracks are very readily manufactured, and simple to replace, where different molds or mold cycles require to be accommodated. Tracks with different profiles may be readily machined.

BRIEF DESCRIPTION OF THE DRAWINGS

Certain embodiments of the invention are described by way of illustration, and without limitation of the invention thereto, other than as set forth in the claims hereof, reference being made to the accompanying drawings wherein;

DETAILED DESCRIPTION OF THE INVENTION

Figures 1, 2, 3:
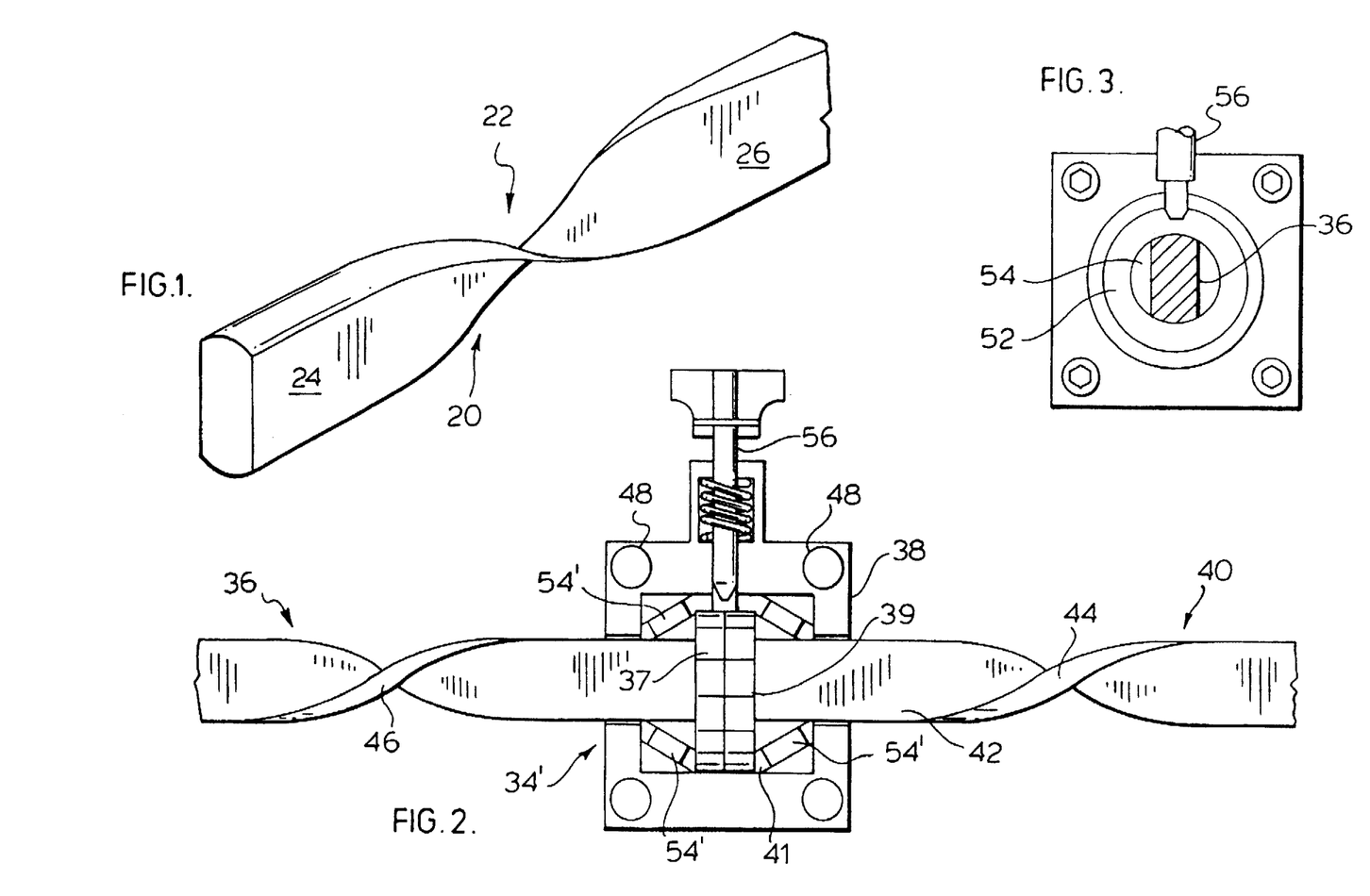
FIG. 1 is a perspective view of a portion of a track embodiment in accordance with the present invention having a cylindrical track with multiple actuation surfaces.
FIG. 2 shows a track mounting housing in diametrical cross-section, in an operational condition.
FIG. 3 is a cross sectional view of the FIG. 2 embodiment in its engaged, operational condition.

Referring to FIG. 1, there is illustrated a portion (20) of an elongated cylindrical track, having a "polar" spiral i.e. a spiral portion (22) about the polar or longitudinal axis of the track. The major surfaces (24), (26) form the actuation surfaces, by means of which relative longitudinal motion of the track (20) is translated into a rotary motion of associated track riders, when the track riders are brought into contact with a spiral deviation (22) or the like, as the track passes longitudinally through the track rider.

FIG. 2 shows a track mounting housing (34) secured to a supporting surface (not shown) by way of machine screws (48). The track comprises two portions (36), (40) in end to end coupled relation by shoulder portions (37), (39) and axially extending coupling pin (41).

Within the axially split housing (38), a pair of opposed taper bearings (54) retain the track shoulder portions (37), (39) in mutually abutting, axially secured relation.

This precludes axial displacement of the track portions (36), (40) relative to the housing (38).

Figure 4:
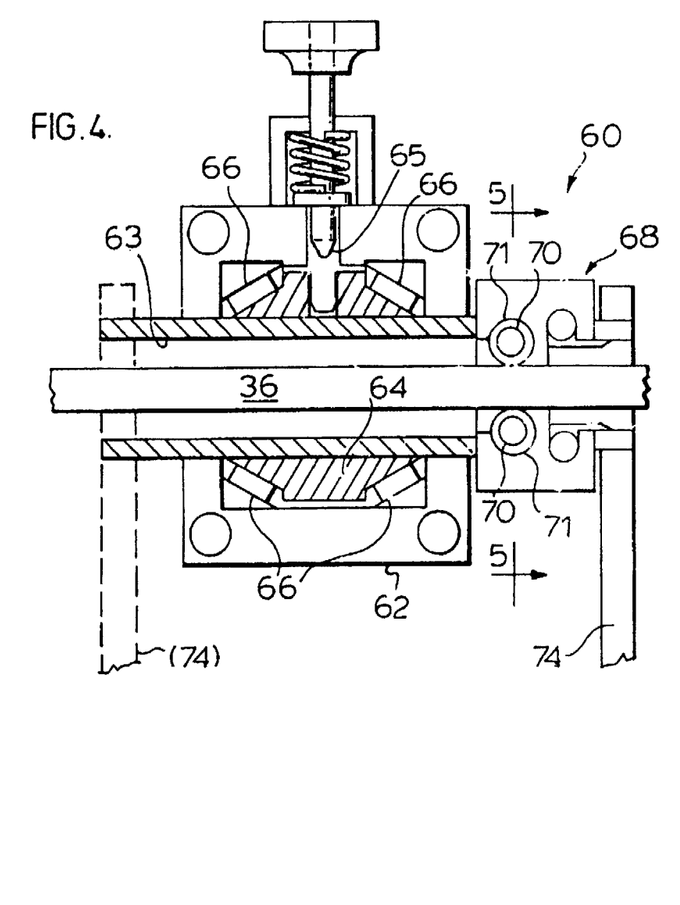
FIG. 4 shows a rotatable track riding means, for transferring displacement motion from the track to an adjacent mechanism.

The track (36), (40) has respective straight actuation surface portions (40), (42) and spirally curved actuation portions (44), (46). These curved spiral surface portions (44), (46) cooperate with track riders (60), as shown in FIG. 4, to generate rotational output therewith.

A manually withdrawable locking pin (56), shown in FIG. 3 in its inserted condition, secures the track (36) to the housing (38) in relatively immovable, non-rotating relation therewith.

With the associated apparatus, such as a press in an inoperative state, and with the mold open, the withdrawal of the spring-loaded pin (56) permits rotation of the track (36) so as to permit the free angular displacement of the track riders (60) and their associated output members, with free movement of the connected, driven mechanism referred to below. However, the track riders (60) are usually also simultaneously immobilized.

In FIG. 3, a hand-actuated locking pin (56) is shown in the engaged "clutching" condition, wherein the track (36) is secured in its non-rotational mode, such that axial displacement of the track (36) produces actuation of the associated track riders (60), referred to below, when a spiral portion of track is encountered.

Figure 4A:
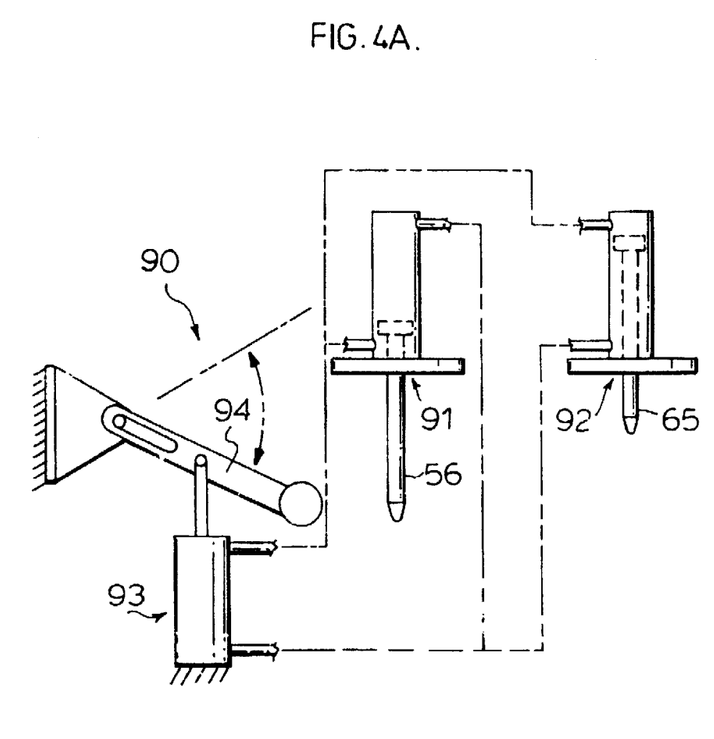
FIG. 4A is a schematic of a hydraulic ON/OFF manual control, in relation to two locking pins of a possible series of such pins.
Figures 5, 6:
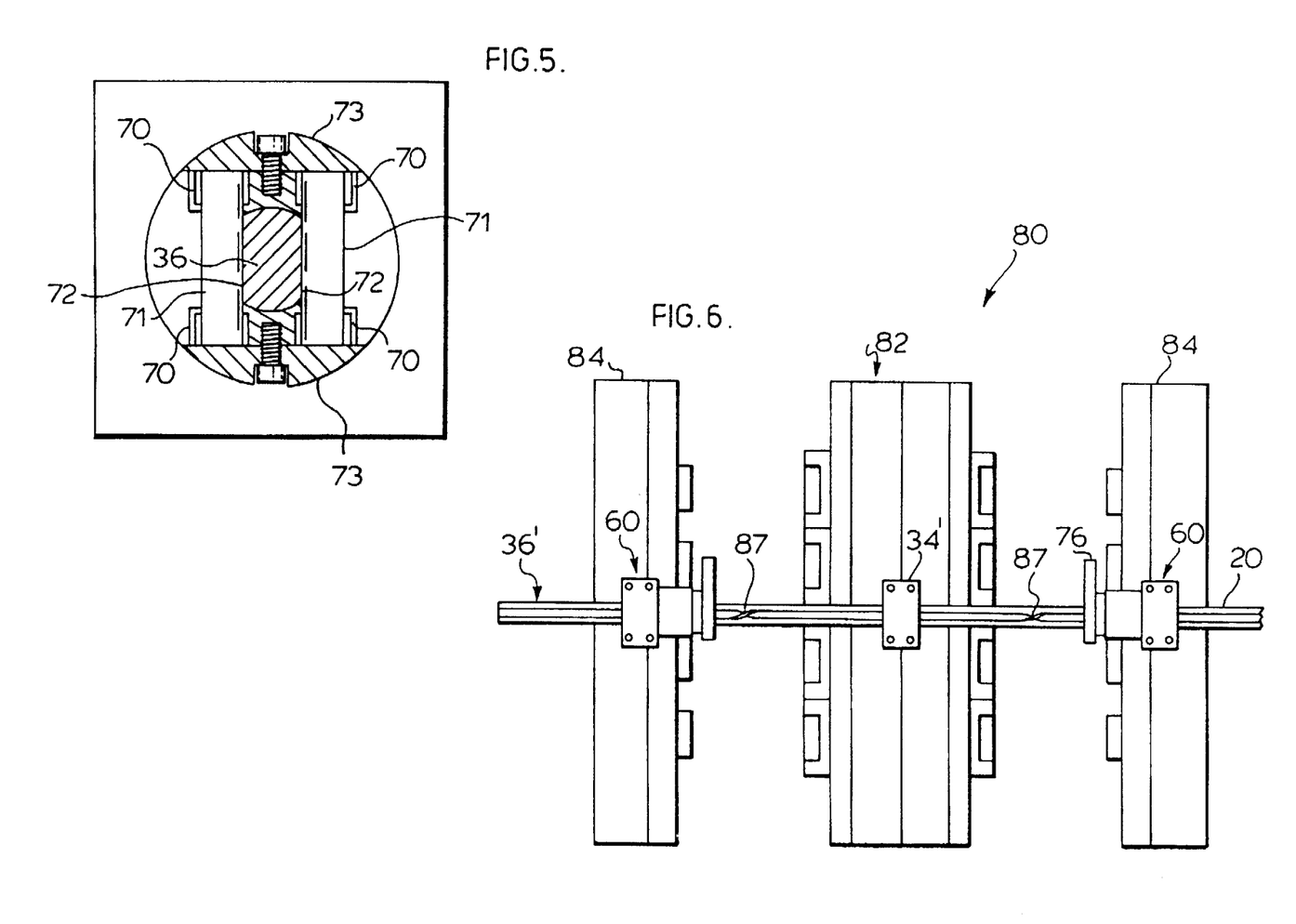
FIG. 5 is a view taken at section 5—5 of FIG. 4.
FIG. 6 is a plan view of a two-stack multi-cavity mold, showing a schematic portion of the subject motion transfer system.

Turning to FIGS. 4, 4A and 5, a track rider (60) has an axially split housing (62). A central hollow shaft (63) has an annular ring portion (64) with axially tapered annular shoulders against which opposed taper bearings (66), (66) are located in centering, retaining relation.

An insertable locking pin (65), shown in its withdrawn, operating condition, to permit rotation of the output shaft (63), may be inserted into locking relation with the ring portion (64), to immobilize the track rider (60) against operation.

A housing portion (68) is secured to the hollow shaft (63), and has a track (36), (40) extending centrally therethrough, for axial displacement therein.

A pair of tracking rollers (71), (71) are rotatable supported at their ends by needle bearings (70), (70).

The tracking rollers (see FIG. 5) engage the opposed actuation surfaces (72), (72) of the track (36), thereby maintaining the track and the housing portion (68) in mutual angular engagement, while leaving the track (34) free to be displaced axially, for passage through the rider (60).

An actuating pin (65), when in a disengaged position, permits the transfer of rotary output by the rider (68). Reversal of the respective conditions of the pins (56), (65) serves to disable the system, so that operation of the press and mold can proceed without corresponding operation of the system mechanism.

Referring to FIG. 4A, this illustrates the actuating pin (56), by which the track is normally held in non-rotating relation, and an actuating pin (65) for a single track rider (60), together with a manually operated hydraulic controller (90).

It will be understood that for a stacked mold, as shown schematically in FIG. 6, a plurality of actuating pins (65) will normally be provided.

In the FIG. 4A illustrated arrangement, a pair of double-acting actuating cylinders (91), (92) are connected in respective position controlling relation with the actuating pins (56), (65). The actuating cylinders (91), (92) connect with control cylinder (93). This cylinder (93) has a hand control lever (94), the cylinder (93) being double-acting. The cylinders (91), (92) are connected in mutually reversed hydraulic connection with the cylinder (93), such that in one extreme position of the lever (94) the pin (56) is in the engaged position and the pin (65) is in its disengaged position. Reversal of hand lever (94) reverses the positions of the pins (56), (65). Thus, a single hand motion by the press operator moves the product take-off system from an engaged condition to a disengaged, disabled condition; and vice versa.

It will be readily understood that a plurality of actuating cylinders (92) may be connected hydraulically in mutual parallel relation, for simultaneous operation by the control cylinder (93). The swept volume of the master cylinder will evidently at least equal the total swept volume of the plurality of actuating cylinders (92).

In operation, with the locking pin (56) engaged and the rider housing locking pin (65) in an unlocked condition, axial displacement of the track (36) as a consequence of the opening of the mold produces rotation of the rider housing (68) in response to angular (spiral) inclinations and changes in the track (36), located centrally within the rider housing (68).

Figure 7:
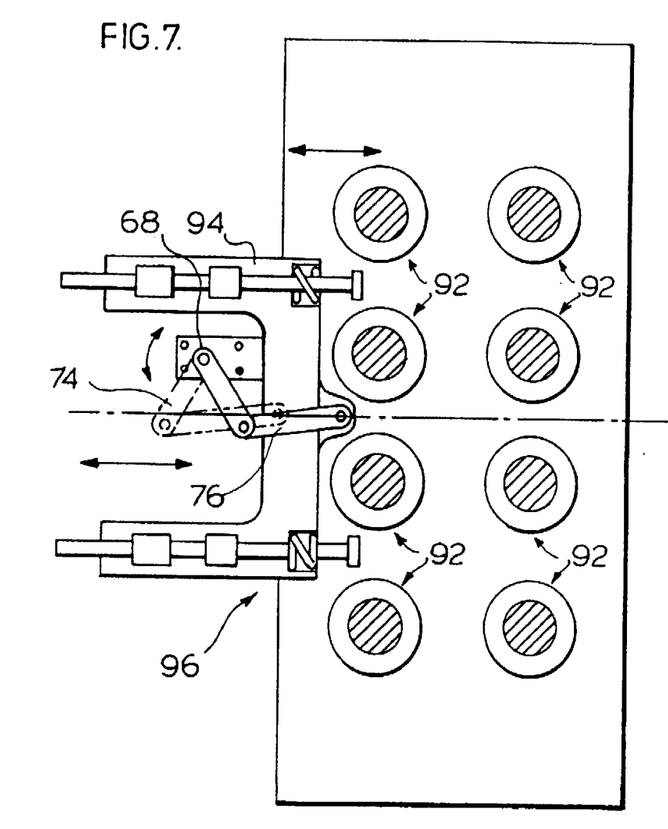
FIG. 7 is a front elevation of a multi-cavity mold face, showing a schematic arrangement of the subject motion transfer system in relation to retractable product take-off means therefor.
Figure 8:
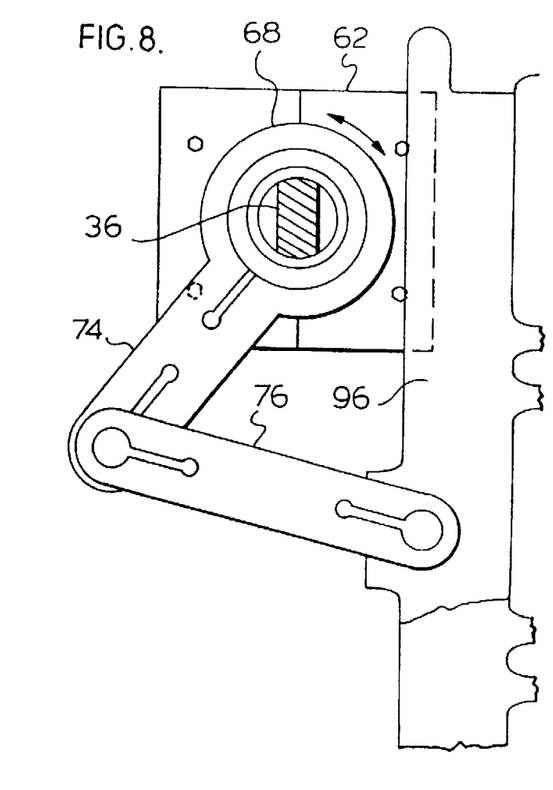
FIG. 8 is a schematic end view of a portion of the motion transfer crank and conn-rod mechanism.

Referring also to FIG. 8, a crank (74) secured to the housing (68) of the track rider (62) connects by way of a connecting (conn) rod (76) to the apparatus being controlled (see also FIG. 7), namely the side-mounted product take-off system. Referring to FIG. 5, the four needle-beating races (70) are shown in supporting relation wit the twin tracking rollers (71). A pair of removable keepers (73) retain the tracking rollers in place, and facilitate their rapid removal if required.

In operation, upon axial displacement of the track (36), the angular changes in the actuation surfaces (72), (72) of the track, due to their spiral inclination result in corresponding rotational displacement of the tracking rollers (71) about the track polar axis, which produces angular rotation of the housing (68), and with it the crank (74), with resultant displacement of the conn rod (76) and its attached product take-off apparatus (96), of FIGS. 7 and 8.

It will be understood that the housing (68) may incorporate a gear arrangement to provide a rotary output, including possible gear ratio changes in control of the output.

It should be clearly understood that a similarly constructed system can be operated in a somewhat reverse fashion. With the track supported for free rotation about is polar axis, under the action of a non-rotatable track rider, as it contacts a spiral portion of the axially moving track, the consequent track rotation can be imparted to other track riders located in contact with portions of the track. These portions of the track may be straight (i.e. non-spiral), or they may be spiral. This in turn will then actuate the respective crank arms (74), and with them the conn rods (76). It should be further understood that the motion or the absence of motion of the crank arms (74) would be the algebraic sum of two such inputs from the track (34).

Turning to FIG. 6, a two-level stacked mold (80) has a central mold body (82), and two opening mold portions (84). The mold (80) has a plurality of cavities, from which the molded product is ejected, upon the opening of the mold.

A track (20) is shown, secured to the elements (82), (84), (84) of the mold (80), in "strapped-on" relation, by way of housing (34) (FIG. 2) and housings (62) (FIG. 4).

Track mounting housing (34) (of FIG. 2) is secured to central body (82) of the mold, and rider portions (60) (of FIG. 4 type) are carded upon the outer mold portions (84).

It will be noted that the track (20) is illustrated as having localized actuation surfaces (87).

In operation, with the locking pin (56) engaged, so as to restrain the track against rotation, opening motion of the press, together with the mold, moves the outer mold portions (84), (84) away from the central mold portion (82). The track riders (60) are carried outwardly relative to the track (20), which is locked against rotation. When the track riders (60) encounter the spiral deviance (87) of the actuation surfaces of the track (20), they produce rotation of the rider housing portions (68) and their attached crank arms (74), (FIGS. 2, 7 and 8) to displace conn rods (76) and their respective attachments, namely, the product take-off mechanisms (96), only one of which is illustrated.

During this operation, the rider locking pin or pins (65) are retracted to the unlocked position, to permit rotation of the portion (68). Reversal of operation, by closing of the mold, reverses the above sequences, to safely retract the auxiliary mechanisms clear of the closing mold interfaces. Referring again to FIG. 7, a rectangular mold face (90) is shown, having a total of eight cavities (92).

A track rider (60) has its conn rod (76) connected in positioning relation with the frame (94) of a product take-off mechanism (96).

The mechanism (96) is similar to those product take-off systems known in the prior art, and does not, per se, form the present invention.

Due to the strap-on nature of the subject motion transfer system, on order to achieve optimized access to the mold, alternative angular locations of the system about the mold are possible, with corresponding adaptation of the product take-off mechanisms.

The subject motion transfer mechanism is well suited to providing both synchronous and asynchronous actuation, in accordance with the requirements of the type of machine in use.

INDUSTRIAL APPLICABILITY

There is a wide field of potential use for this type of simple motion transfer system; the available market in the molding industry by itself is very large.

What is claimed:

1. A motion transfer mechanism for transferring motion between a first component and a second component, the mechanism comprising:

an elongate track mounted to said first component, the track having a polar axis, and an external actuation surface extending along a portion of the length of the track, the track having at least one portion of the actuation surface inclined at a predetermined spiral angle about the polar axis;

track riding means, mounted to said second component in guided contacting relation with the actuation surface, for longitudinal displacement relative to the actuation surface, and for selective predetermined rotational displacement in response to said longitudinal displacement;

track support means, mounted to one of said first and second components, for selectively securing of the track in predetermined axial relation relative to the track riding means; and actuating means for producing relative longitudinal displacement between the first and second components thereby transferring said longitudinal displacement into said rotational displacement of the track riding means.

2. The motion transfer mechanism as set forth in claim 1, wherein the track riding means is mounted for rotational displacement about the polar axis of said track.

3. The motion transfer mechanism as set forth in claim 2, wherein:

the first and second components comprise first and second mold faces of an openable stacked mold; and the track riding means actuates retractable product transfer means, in synchronized operating relation with one of said mold faces, for introducing the transfer means between the faces of the mold upon the opening thereof.

4. The motion transfer mechanism of claim 3, including disengagement means for selectively enabling and disabling the operative interaction of the track with at least one of the track riding means and the track support means.

5. The mechanism of claim 4, wherein:

the track support means comprises a track following shoulder rotatably mounted in a support housing secured to a first mold face, and said disengagement means comprising first pin mounted in the support housing and selectively engageable with the shoulder; and the track riding means comprises a pair of track following rollers mounted in a roller turret for pivoting about the polar axis in a track rider housing, and said disengagement means further comprising a second pin mounted in the rider housing and selectively engageable with the turret.

6. The mechanism of claim 5, wherein said disengagement means include hydraulic displacement means, for elective engagement and disablement of said first and second pins.

7. The mechanism of claim 6, wherein said disengagement means include manually operated controls.

8. The mechanism as set forth in claim 6, said disengagement means having a plurality of displaceable locking means interconnected for simultaneous operation of said first and second pins.

9. The mechanism as set forth in claim 6, said disengagement means including hydraulic cylinder means including a plurality of actuating cylinders and a control cylinder.

10. The mechanism as set forth in claim 3, wherein at least one said product transfer means is located at one side of said mold.

11. The mechanism as set forth in claim 10, said track being of extended length, approximately the full opening stroke of a selected mold press, to enable unimpeded opening of the press in which said mold is mounted, said track riding means being free to pass along substantially the full length of said track.

12. The mechanism as set forth in claim 11, in combination with said mold and said mold press.

13. The combination as set forth in claim 12, said track having at least two said actuation surfaces.

14. The combination as set forth in claim 12, including:

disengagement means for selectively enabling and disabling the operative interaction of the track with the track riding means and the track support means; and wherein;

the track support means comprises a track following shoulder rotatably mounted in a support housing secured to a first mold face, and said disengagement means comprising a first pin mounted in the support housing and selectively engageable with the shoulder; and the track riding means comprises a pair of track following rollers mounted in a roller turret for pivoting about the polar axis in a track rider housing, and said disengagement means further comprising a second pin mounted in the rider housing and selectively engageable with the turret.

15. The combination as set forth in claim 12, said mold being a stacked mold having a plurality of levels, said mechanism having product guidance means movable in use between the open faces of said stacked mold.

* * * * *

UNITED STATES PATENT AND TRADEMARK OFFICE
CERTIFICATE OF CORRECTION

PATENT NO. : 5,681,595
DATED : October 28, 1997
INVENTOR(S) : Nick Travaglini

It is certified that error appears in the above-identified patent and that said Letters Patent is hereby corrected as shown below:

Column 8, line 30, "are carded upon" should read
--are carried upon--.

Signed and Sealed this

Fifteenth Day of May, 2001

*Attest:*

NICHOLAS P. GODICI

*Attesting Officer*  *Acting Director of the United States Patent and Trademark Office*